United States Patent [19]
Willinger

[11] Patent Number: 5,784,995
[45] Date of Patent: Jul. 28, 1998

[54] PET BED

[75] Inventor: Jonathan Willinger, Tenafly, N.J.

[73] Assignee: J. W. Holdings Corp., Tenafly, N.J.

[21] Appl. No.: 550,616

[22] Filed: Oct. 31, 1995

[51] Int. Cl.⁶ ........................................... A01K 1/015
[52] U.S. Cl. ............................ 119/28.5; 5/722; 5/738
[58] Field of Search ......................... 119/28.5, 526, 119/471; 5/694, 722, 723, 738, 727

[56] References Cited

U.S. PATENT DOCUMENTS

| | | | |
|---|---|---|---|
| 4,021,872 | 5/1977 | Powell | 5/722 |
| 4,168,554 | 9/1979 | Hindes | 5/738 X |
| 4,693,691 | 9/1987 | DeYoe | 5/694 X |
| 4,706,313 | 11/1987 | Murphy | 5/722 |
| 4,872,229 | 10/1989 | Brady | 5/694 X |
| 5,000,116 | 3/1991 | Fife et al. | 119/28.5 |
| 5,144,911 | 9/1992 | Moore et al. | 119/28.5 |
| 5,220,884 | 6/1993 | Townsend | 119/496 |
| 5,226,384 | 7/1993 | Jordan | 119/28.5 |
| 5,320,066 | 6/1994 | Gunter | 119/28.5 |

*Primary Examiner*—Michael J. Carone
*Assistant Examiner*—Yvonne R. Abbott
*Attorney, Agent, or Firm*—Helfgott & Karas, P.C.

[57] ABSTRACT

A pet bed includes a core of soft bedding material and a porous cover mounted over the bedding material. An opening is formed in the cover for receiving a removable porous cartridge. The cartridge is filled with any of a number of agents such as deodorants and insect repellents such as cedar wood chips. A retainer such as a pouch is provided between the cover and the bedding material for fixing the cartridge in a central location over which a pet rests.

17 Claims, 5 Drawing Sheets

PET BED

BACKGROUND OF THE INVENTION

1. Field of the Invention

The present invention relates in general to pet bedding and in particular to a foam pet bed having a cover formed with a pocket for receiving a replaceable deodorizing and insect repelling cartridge.

2. Description of Prior Developments

Pet beds have been in use for many years for providing a comfortable resting area for domestic animals such as dogs and cats. A problem often associated with such beds is the gradual soiling of the bedding materials. Moreover, after a period of use such beds can become foul smelling and infested with insects such as fleas and mites.

Although pet beds have been provided with removable covers which can be washed and reused, the underlying padding or mattress is generally not easily cleaned due to its relatively large size. In these cases, the entire padding or mattress has to be replaced at considerable cost.

In those cases where the padding is constructed with a deodorizing or insect repelling filler material, replacement of the entire padding and/or filler material is particularly inconvenient. Additionally, the deodorizing and insect repelling capabilities of such fillers have been shown to greatly diminish over a short period of time.

For instance, in those cases where the padding has been constructed using cedar as the filler the deodorizing and or insect repelling capabilities of the cedar have been shown to diminish almost entirely, often, in a period of less than six months.

Accordingly, a need exists for a pet bed which not only includes a removable washable cover, but also includes an inexpensive replaceable filler material which provides deodorizing and insect repelling capabilities.

SUMMARY OF THE INVENTION

The present invention has been developed to fulfill the needs noted above and therefore has as an object the provision of a pet bed which includes a removable washable outer cover.

Another object of the invention is to provide a pet bed which includes a replaceable cartridge which may contain one or more filler materials such as deodorants, insect repellents and/or air fresheners.

Another object of the invention is to provide a pet bed which permits a quick, inexpensive and convenient way to restore the bed's deodorizing and insect repelling capabilities.

Another object of the invention is to provide a pet bed which includes a removable cover having a pocket or retainer formed therein for receiving a replaceable cartridge.

Still another object of the invention is to provide a pet bed with a replaceable deodorizing cartridge which is positioned directly beneath a pet so as to protect the underlying padding material from soiling and wear.

Yet another object is to provide a pet bed with a replaceable deodorizing cartridge which is positioned over a cushion and directly beneath a pet so that the effectiveness of the deodorant and any other agents provided in the cartridge is maximized and the amount of filler material necessary for effective action is minimized.

These and other objects are met by the present invention which includes an inner mattress or cushion provided with an outer removable cover. The cover may be formed with a pocket or receptacle for receiving a replaceable cartridge and for maintaining the cartridge in a predetermined position on a top surface portion of the mattress.

The cartridge may include any of a number of agents such as deodorants, fragrances and/or insect repellents. A particularly suitable filler agent has been found to be wood chips, particularly cedar chips which act as a deodorant, fragrance and insect repellant.

By using a thin layer of deodorant provided in cartridge form, only a small amount of active cartridge filler material is required. This is in contrast with prior pet cushions which are completely filled or mixed with deodorizing and insect repelling materials.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawings, like reference characters designate like parts.

DETAILED DESCRIPTION OF THE PREFERRED EMBODIMENTS

Figure 1:
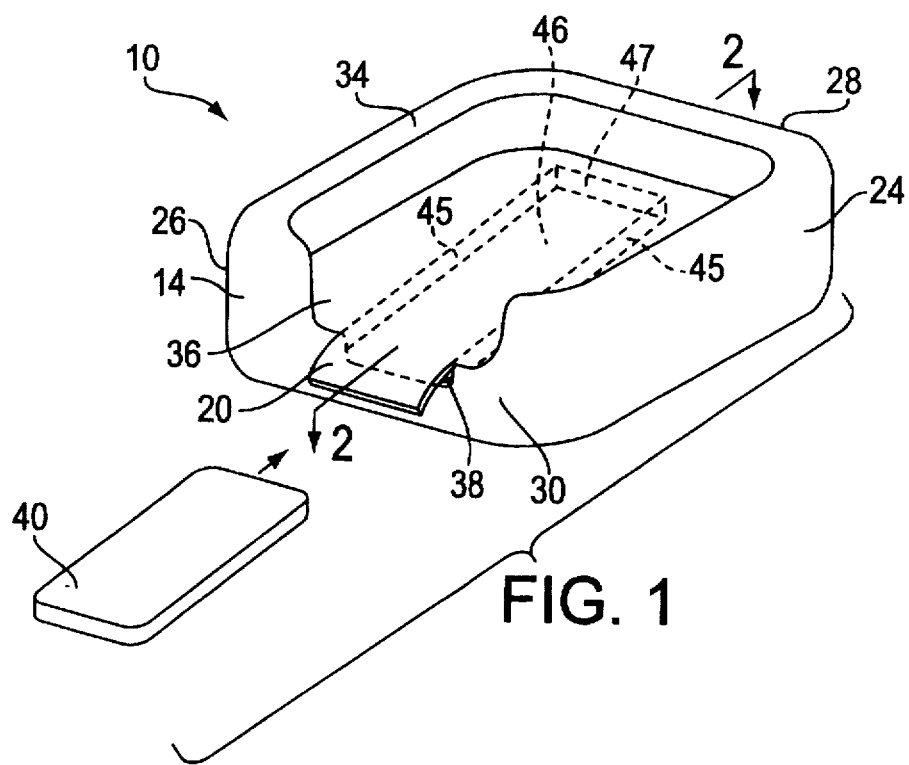
FIG. 1 is an exploded perspective view of a first embodiment of a pet bed constructed in accordance with the present invention.

The present invention will now be described in conjunction with the drawings, beginning with FIGS. 1, 2 and 3, which show a pet bed or pet cushion 10 constructed in accordance with a first embodiment of the invention. Pet bed 10 may be formed from a single molding of bedding material 12 of the type commonly used to form pillows, cushions and mattresses. For example, resilient polyurethane or polystyrene foam may be molded to the shape as seen in FIG. 1 to form a core of bedding material 12. Alternatively, pet bed 10 may be constructed from two or more individual foam components glued together.

Although foam bedding material 12 functions well in this application, other materials may be used. Examples include floss type fillers, foamed granules of the type used for packing and shipping and any other relatively soft material commonly used for stuffing pillows, mattresses and the like.

A cover 14 is provided around the exterior of the bedding material 12. Cover 14 may be formed of any suitable porous fabric or cloth material such as natural cotton or synthetics such as polyester. Perforated plastic sheeting may also be used to form cover 14. In the first example shown in FIGS. 1, 2 and 3, cover 14 is removably retained over the integral shaped foam bedding material 12 with an elastic border 16 (FIG. 3) located on the bottom or underside 18 of the foam bedding material. Border 16 acts in the manner of a fitted sheet by stretching over the bedding material and resiliently retracting over material 12.

Alternatively, elastic border 16 may be replaced with a simple hem sewn from the fabric of cover 14. In this case, the resilience of the foam bedding material 12 stretches the cover outwardly and secures the cover in place. That is, the bedding material is compressed, inserted into the cover 14 and allowed to expand against the cover. If loose fillers are used for bedding material 12, cover 14 completely covers the material 12 in the manner of a slip cover.

Figure 2:
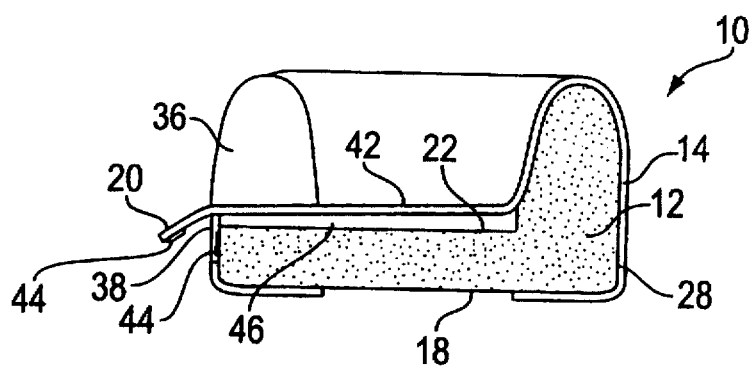
FIG. 2 is a central longitudinal sectional view of the bed of FIG. 1 taken along section line 2—2 of FIG. 1.
Figure 3:
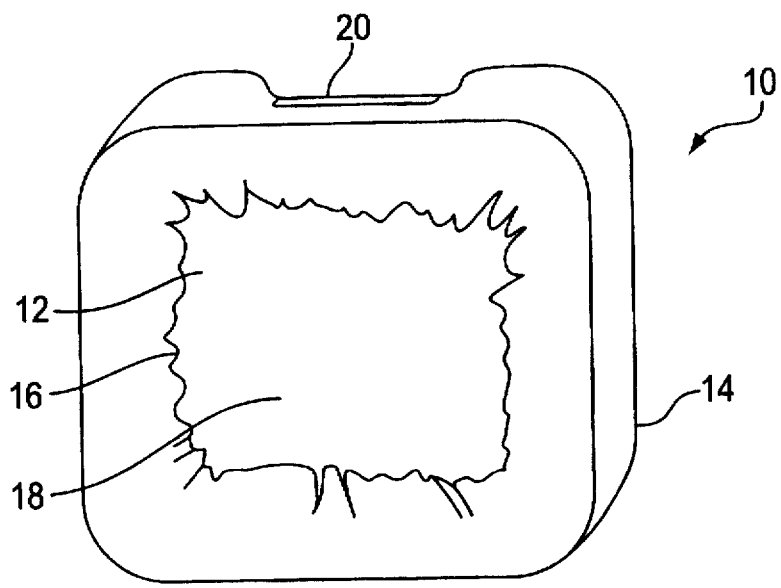
FIG. 3 is a bottom perspective view of the bed of FIG. 1.

As further seen in FIGS. 1 and 2, cover 14 is formed with a flap 20 which provides access to the interior of the cover adjacent an upper generally rectangular flat mattress surface or floor portion 22 (FIG. 2) of the bedding material 12. In this example, bedding material 12 is formed with a generally rectangular shape with a pair of opposed side walls 24,26, a rear wall 28 and a front wall 30.

Each wall 24,26,28,30 extends upwardly above the floor surface 22 so as to define a rim wall 34 extending around the mattress or floor surface portion 22. An access or opening 36 is formed in the front wall 30 for facilitating entry and exit to and from the pet bed 10. Flap 20 is located adjacent opening 36 so as to allow unobstructed access to floor portion 22 via slot 38.

Slot 38 is dimensioned to receive a replaceable cartridge 40. Cartridge 40 is shown as a generally flat rectangular component formed of a generally soft semi-rigid porous material such as cloth, perforated paper or thin perforated cardboard. The hollow interior of cartridge 40 is filled with any one or combination of numerous fillers such as deodorants, insecticides or insect repellents.

A particularly advantageous filler is cedar wood chips which serve as both a deodorant and an insect repellant. The cedar chips are relatively inexpensive and are also soft and conformable under the weight and pressure of a sleeping pet when used in combination with soft bedding material 12.

Figure 4:
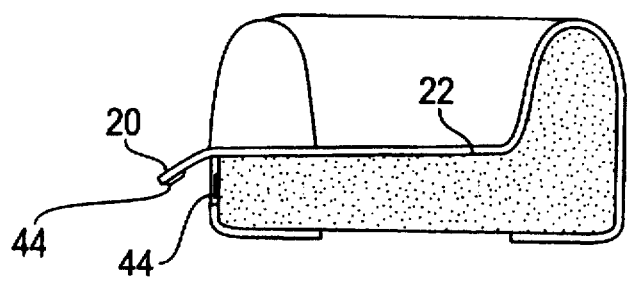
FIGS. 4 and 5 are sectional views of a second embodiment of the invention taken along sections corresponding to section line 2—2 of FIG. 1.

In its basic form, the invention simply provides for the insertion of cartridge 40 between floor surface 22 of the bedding material 12 and the flat sheet portion 42 of cover 14 which overlies floor surface 22 and extends over the flat horizontal plane area upon which a pet rests. This arrangement is shown in FIGS. 4 and 5 wherein the open weave paper cartridge 40 is filled with cedar chips 42.

That is, cartridge 40 is interposed between the cover 14 and bedding material 12 directly beneath a resting pet and in direct contact with the cover and the bedding material. This arrangement protects the bedding material underlying the cartridge 40 insofar as cartridge 40 will absorb most or all of the fine solids and liquids which may penetrate the cover 14. Moreover, cartridge 40 further protects the soft bedding material from wear, tear and abrasion.

In the event the cartridge becomes worn, excessively soiled or due for periodic replacement, all that is required is to lift open flap 20, remove the spent cartridge 40 and replace it with a fresh cartridge. Flap 20 may be provided on its inside surface with a hook and loop type strip fastener 44 made of Velcro material or the like. The bedding material 12 or the cover 14 may also be provided with a mating strip fastener 44 to secure the cartridge between the cover and bedding material. Any other type of fastener may be used in place of hook and loop type fasteners such as zippers, snap fasteners, laces, buckles and the like.

Figure 5:
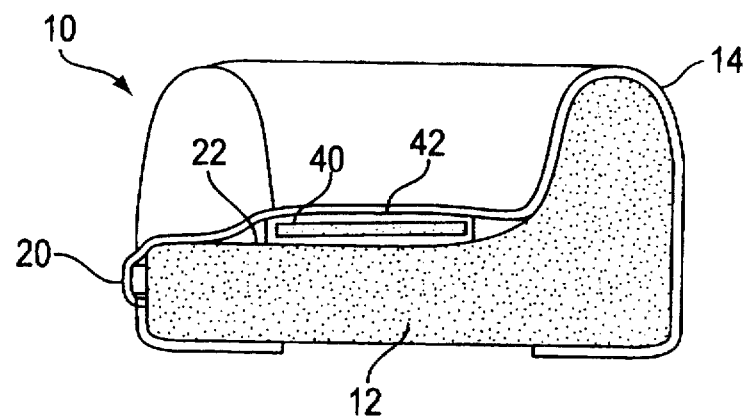

Although the cartridge 40 as shown in FIG. 5 is adequately held between floor surface portion 22 and cover 14 with a simple sandwiched or laminated resilient friction fit, a more positive positioning and retention of the cartridge on floor surface portion 22 is generally desirable since the cartridge is typically smaller than area 22 and can therefore shift about and become misaligned if sufficiently disturbed. Positive retention of the cartridge 40 can be accomplished by forming a recess 46 in floor surface portion 22 of bedding material 12 as shown in FIGS. 1 and 2.

Recess 46 is dimensioned to match and complement the shape of cartridge 40 so that the side walls of the recess 46 snugly receive and retain the cartridge therebetween. This arrangement centers and holds the cartridge in the middle of the floor surface portion 22 directly beneath a resting pet where the cartridge can provide maximum effectiveness in deodorizing, repelling insects and preventing wear of the bedding material. Side to side movement of the cartridge is prevented by engagement with the side walls 45 of recess 46. Flap 20 and end wall 47 prevent front to rear movement of cartridge 40.

Figure 6:
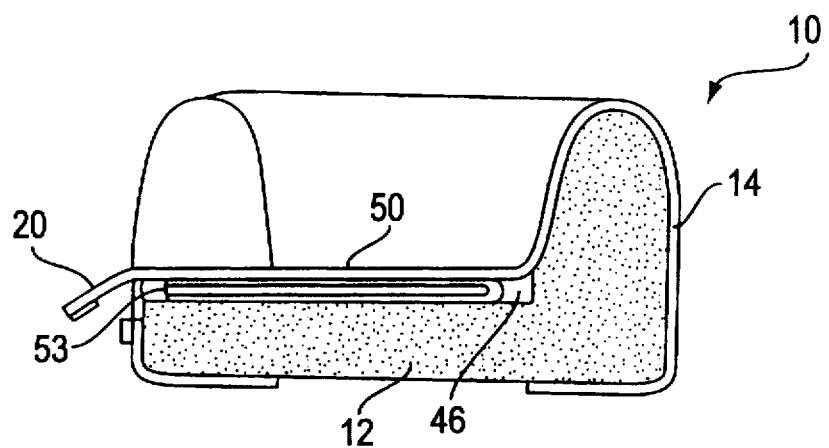
FIG. 6 is a view similar to FIG. 2 of a third embodiment of the invention.
Figure 7:
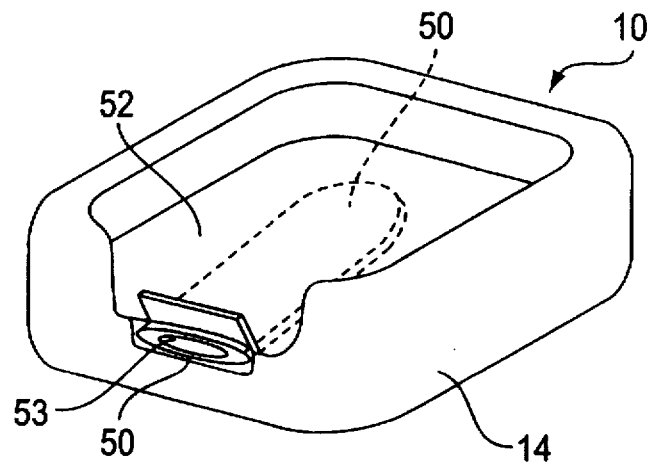
FIG. 7 is a perspective view of FIG. 6.

Even greater retention and alignment of the cartridge 40 over floor surface portion 22 can be achieved by providing a cartridge mounting or retainer 50 on cover 14. For example, as seen in FIGS. 6 and 7, an open mouthed pouch or sack 50 is attached by, for example, sewing or adhesive bonding to the underside of cover 14 in a position which aligns the sack 50 over the central portion of floor surface portion 22. The retainer sack 50 is provided with an open mouth 53 which is sized to freely receive cartridge 40 therein with a limited clearance.

In this manner, the cartridge 40 cannot be displaced by the movements of a pet. Although a recess 46 in the surface 22 of the bedding material 12 as described earlier is not required, recess 46 may be used in combination with retainer 50 so as to lock cartridge 40 in place and also eliminate any bump or raised area on floor surface portion 22.

That is, the depth of recess 46 below surface portion 22 can be dimensioned about equal to the thickness of cartridge 40 so that the cover 14 lies essentially flat over a substantially planar floor jointly defined by cartridge 40 and the U-shaped portion 52 (FIG. 7) of bedding material surface portion 22 which surrounds recess 46. This increases pet comfort by providing a flat sleeping or resting surface over the full extent of floor surface portion 22.

It is of course possible to employ other types of cartridge retainers 50, such as adhesive peel-off tape strips attached to the cartridge 40 and smooth surfaced tape mounting strips attached to the underside of cover 14 or to surface 22 for providing a surface to which the peel-off tape strips can be applied. Snap-fit retainers as commonly used in clothing may also be used to secure cartridge 40 to cover 14 or to surface 22.

Even though the cartridge 40 absorbs most of the soiling and wear and even through cover 14 is removable and washable, active pets can eventually wear through the cover 14 and soil and wear the underlying bedding material 12. In this case, the entire bedding material 12 may need to be replaced. In order to avoid this relatively costly event, it is possible to modify the present invention as shown in FIGS. 8 and 9 so that only a cover pad or cushion 54 need be replaced.

Figure 8:
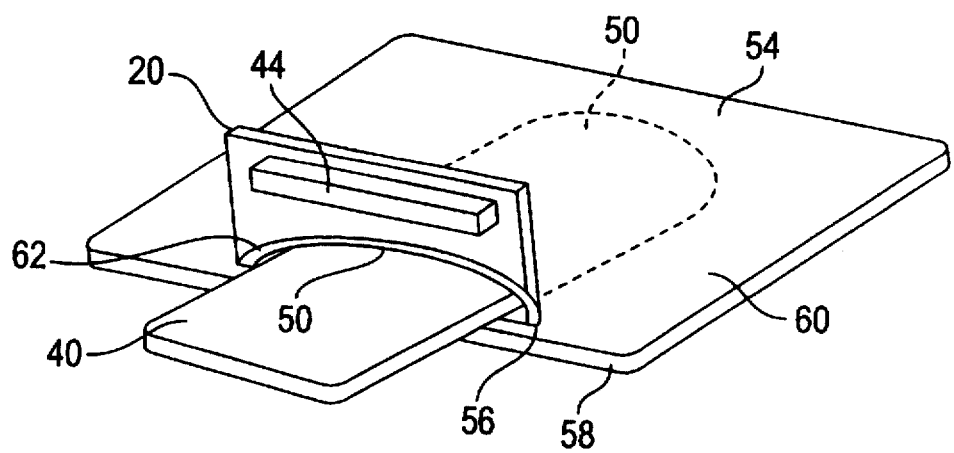
FIG. 8 is a perspective view of a replaceable cushion adapted for use with the bed of FIG. 9.
Figure 9:
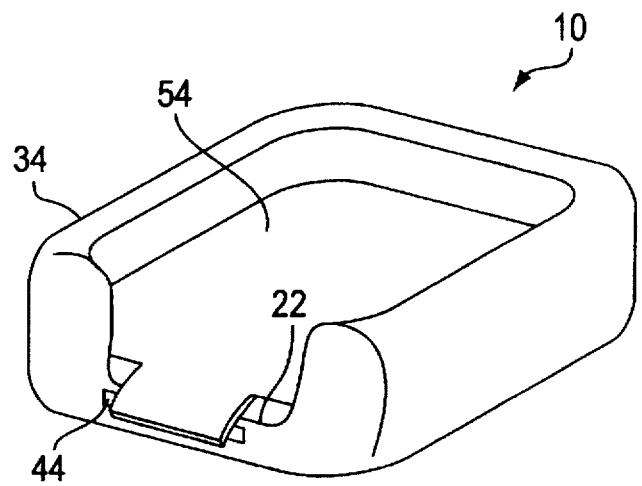
FIG. 9 is a perspective view of a fourth embodiment of the invention.

As seen in FIGS. 8 and 9, a generally rectangular cover pad 54 is dimensioned to fit snugly within walls of bed 10 inside rim 34 and over surface 22. Cover pad 54 may be formed of a foam material similar to or the same as that which forms bedding material 12. An opening 56 is formed along one edge 58 or in one surface 60 of pad 54 to allow for the insertion and removal of cartridge 40. Pad 54 is provided with a sheet-like cover 62 of cloth or porous material similar to that of cover 14 described above.

Cover 62 may include a retainer such as a pocket or pouch 50 for retaining cartridge 40 over a central location of the pad. Other retainers may of course be used in place of a pocket or pouch as indicated above. In this embodiment, cover 62 may be either removable from or permanently sewn around the interior bedding material.

Figure 10:
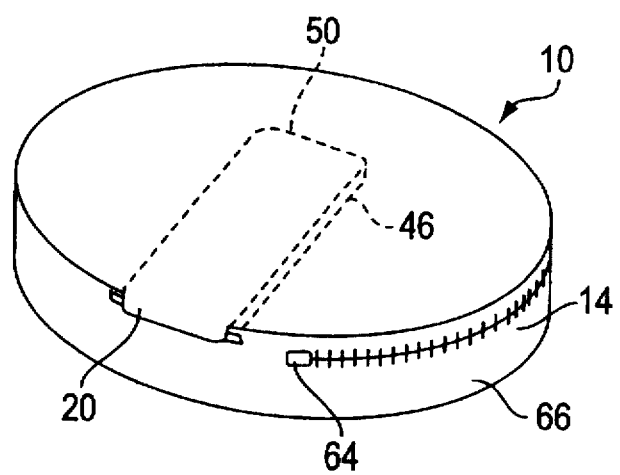
FIG. 10 is a perspective view of a fifth embodiment of the invention wherein the pet bed is constructed as a simple cushion.

A simplified form of the invention is shown in FIG. 10 wherein pet bed 10 is constructed as a cushion. A replaceable and removable cover 14 is provided over a core of bedding material as described above. Cover 14 is formed with a flap 20 and underlying opening for allowing insertion and removal of cartridge 40 therein. The cover 14 may be removably mounted over the underlying bedding material by providing a zipper 64 around the side wall 66 of bed cushion 10.

Cushion 10 and cover 14 may be formed in accordance with any one or more of the features noted above, including a pouch 50, recess 46 and fasteners 44. However, the cushion bed 10 of FIG. 10 is particularly adapted for being filled with loose soft fillers such as fabric stuffing and styrofoam pellets. In this case, cover 14 completely encapsulates the bedding material 12 in the fashion of a sofa cushion.

There has been disclosed heretofore the best embodiment of the invention presently contemplated. However, it is to be understood that various changes and modifications may be made thereto without departing from the spirit of the invention.

What is claimed is:

1. A pet bed, comprising:

a core of bedding material;

a removable cover provided over said core of bedding material said removable cover having an opening formed therein;

a removable cartridge containing a filler material inserted through said opening and located between said cover and said core of bedding material during use of said bed by a pet; and a retainer located between said cover and said bedding material for retaining said cartridge in a predetermined position over said bedding material, wherein said retainer includes a pouch connected to said cover.

2. The bed of claim 1, wherein said cover comprises a flap for covering said opening.

3. The bed of claim 2, further comprising a fastener for removably fastening said flap over said opening.

4. The bed of claim 1, wherein said cartridge comprises a porous cartridge.

5. The bed of claim 4, wherein said filler material comprises cedar.

6. The bed of claim 1, wherein said core of bedding material comprises a floor surface portion having a recess formed therein and wherein said cartridge is removably mounted within said recess.

7. The bed of claim 1, wherein said bedding material comprises a foam material.

8. The bed of claim 1, wherein said cover comprises a removable cover removably mounted over said core of bedding material.

9. A pet bed, comprising:

a core of bedding material;

a core cover mounted over said bedding material;

a pad removably disposed on said core cover and supported by said bedding material;

a pad cover mounted over said pad and having an opening formed therein; and a cartridge removably mounted between said pad and said pad cover.

10. The bed of claim 9, wherein said core defines a rim and wherein said pad is mounted within said rim.

11. The bed of claim 9, wherein said pad cover comprises an opening formed therein for receiving said cartridge.

12. The pet bed of claim 9, further comprising a retainer located between said pad and said pad cover for retaining said cartridge in a predetermined position.

13. The pet bed of claim 9, wherein said core comprises cedar.

14. The pet bed of claim 9, wherein said bedding material comprises a foam material.

15. The pet bed of claim 9, further comprising a flap formed on said pad cover for covering said opening.

16. The pet bed of claim 15, wherein said flap comprises a fastener for fastening said flap over said opening.

17. The pet bed of claim 9, wherein said bedding material comprises loose filler material.

* * * * *